United States Patent [19]
Abott et al.

[11] Patent Number: 4,940,279
[45] Date of Patent: Jul. 10, 1990

[54] CARGO VEHICLE WALL CONSTRUCTION

[75] Inventors: Richard A. Abott, Royal Oak; Stephen J. Ringe, Farmington, both of Mich.; Michael J. Keeler, Canton, Ohio

[73] Assignee: Fruehauf Corporation, Detroit, Mich.

[21] Appl. No.: 324,486

[22] Filed: Mar. 16, 1989

[51] Int. Cl.⁵ .................... B62D 33/04; E04C 1/00
[52] U.S. Cl. ..................... 296/181; 296/183; 52/309.8; 403/340; 29/526.2
[58] Field of Search .............. 296/181, 183; 52/309.8, 52/309.9, 309.14; 403/340, 306, 393; 29/526.2, 455 LM, 463, 451

[56]         References Cited
         U.S. PATENT DOCUMENTS

| 3,003,810 | 10/1961 | Koote et al. | 296/181 |
| 3,393,920 | 7/1968 | Ehrlich | 296/181 |
| 3,853,260 | 12/1974 | O'Hanlon | 52/309.8 |
| 4,505,082 | 3/1985 | Schmitz | 52/309.8 |

Primary Examiner—Robert R. Song
Attorney, Agent, or Firm—Ralph J. Skinkiss

[57]         ABSTRACT

A plate wall cargo vehicle construction is disclosed comprising a multiplicity of light weight laminated panels. Each panel comprises a resinous core material having a metal skin adhesively bonded to each planar surface thereof.

8 Claims, 5 Drawing Sheets

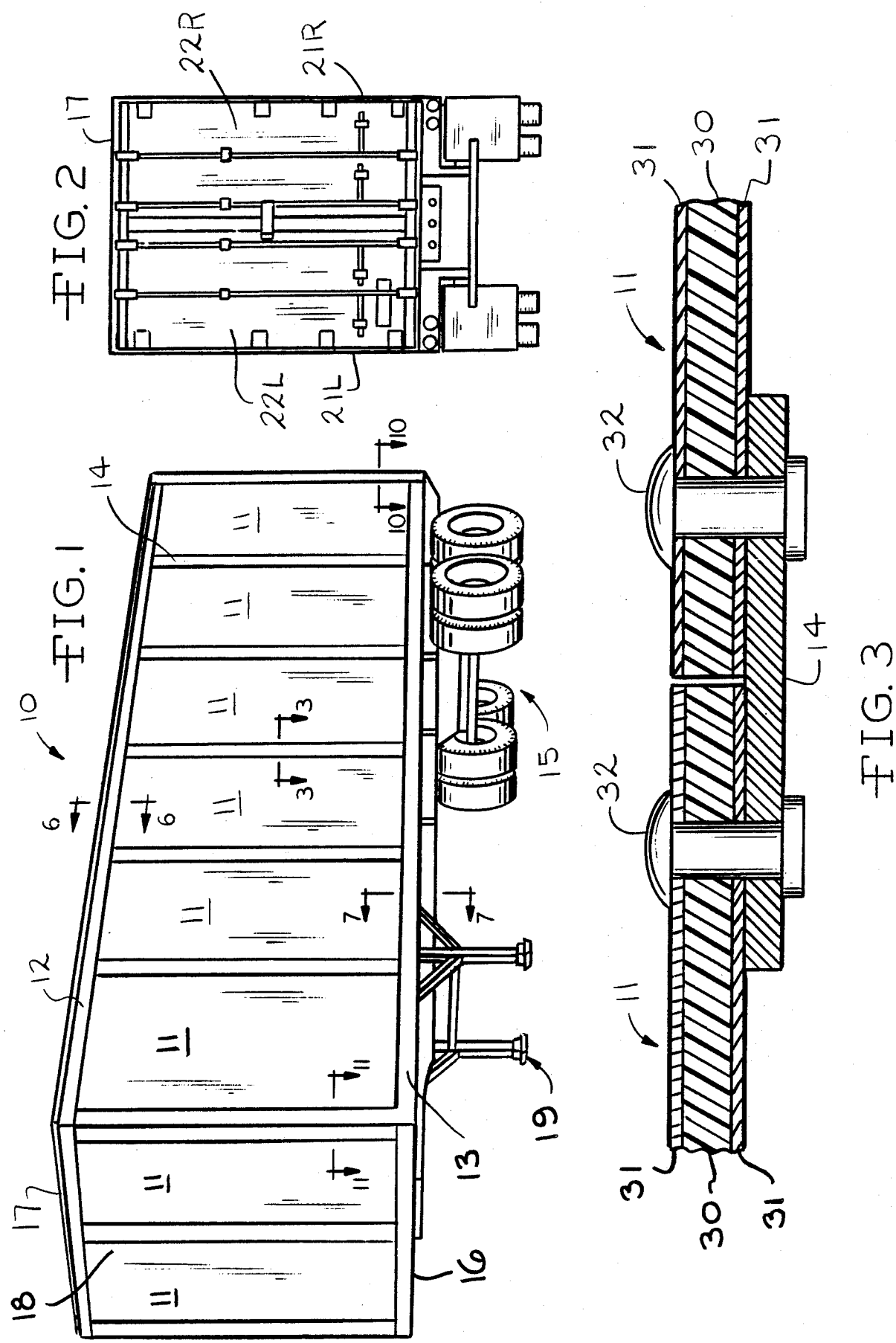

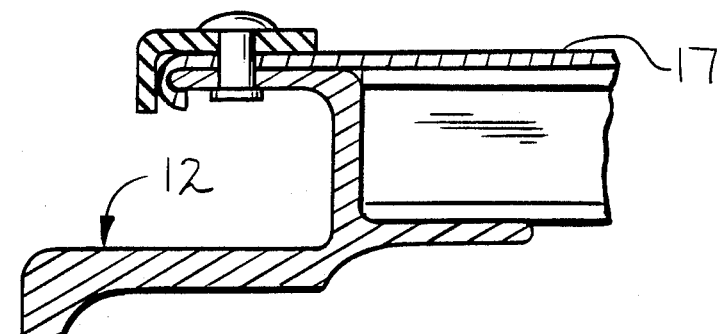
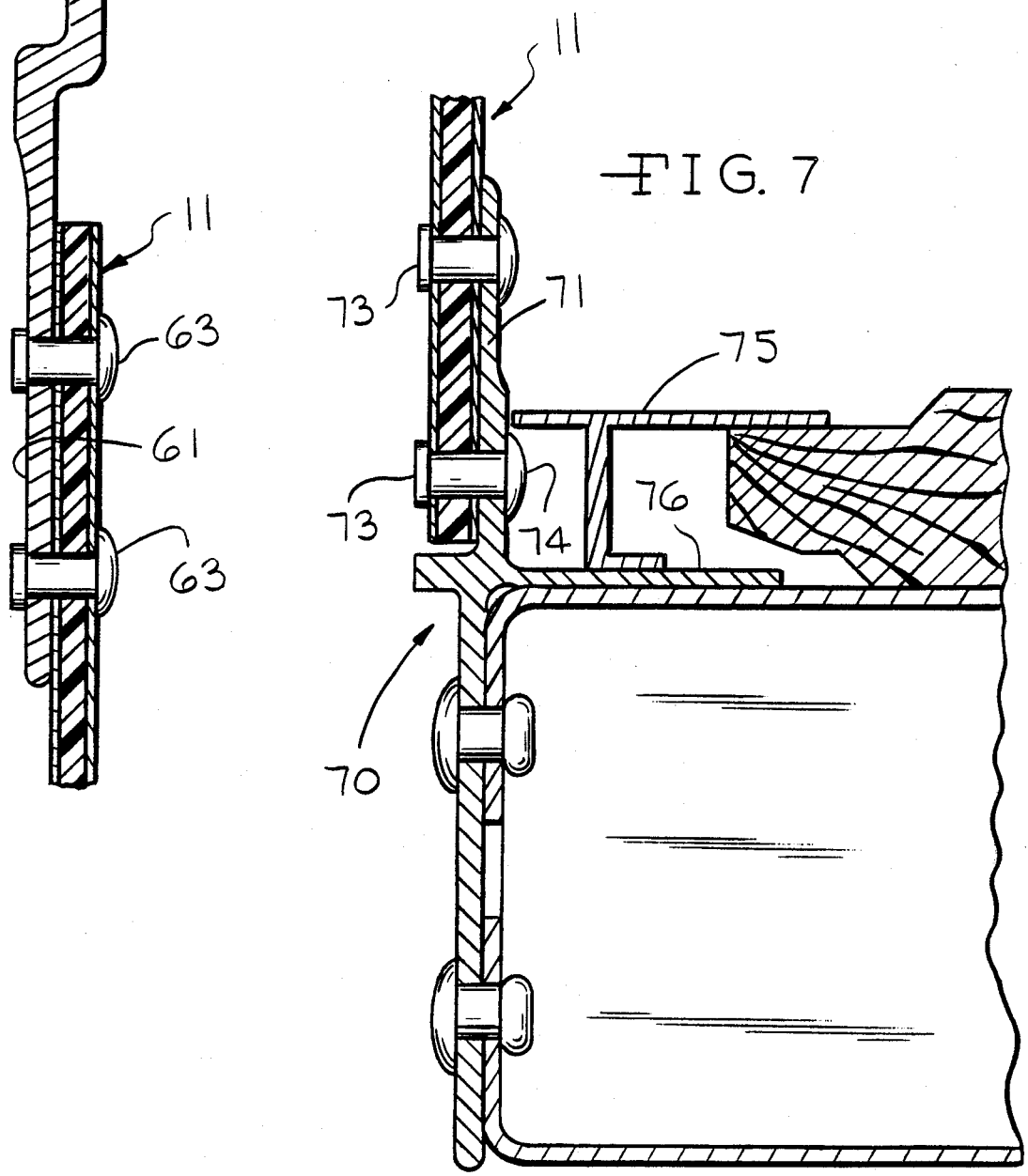

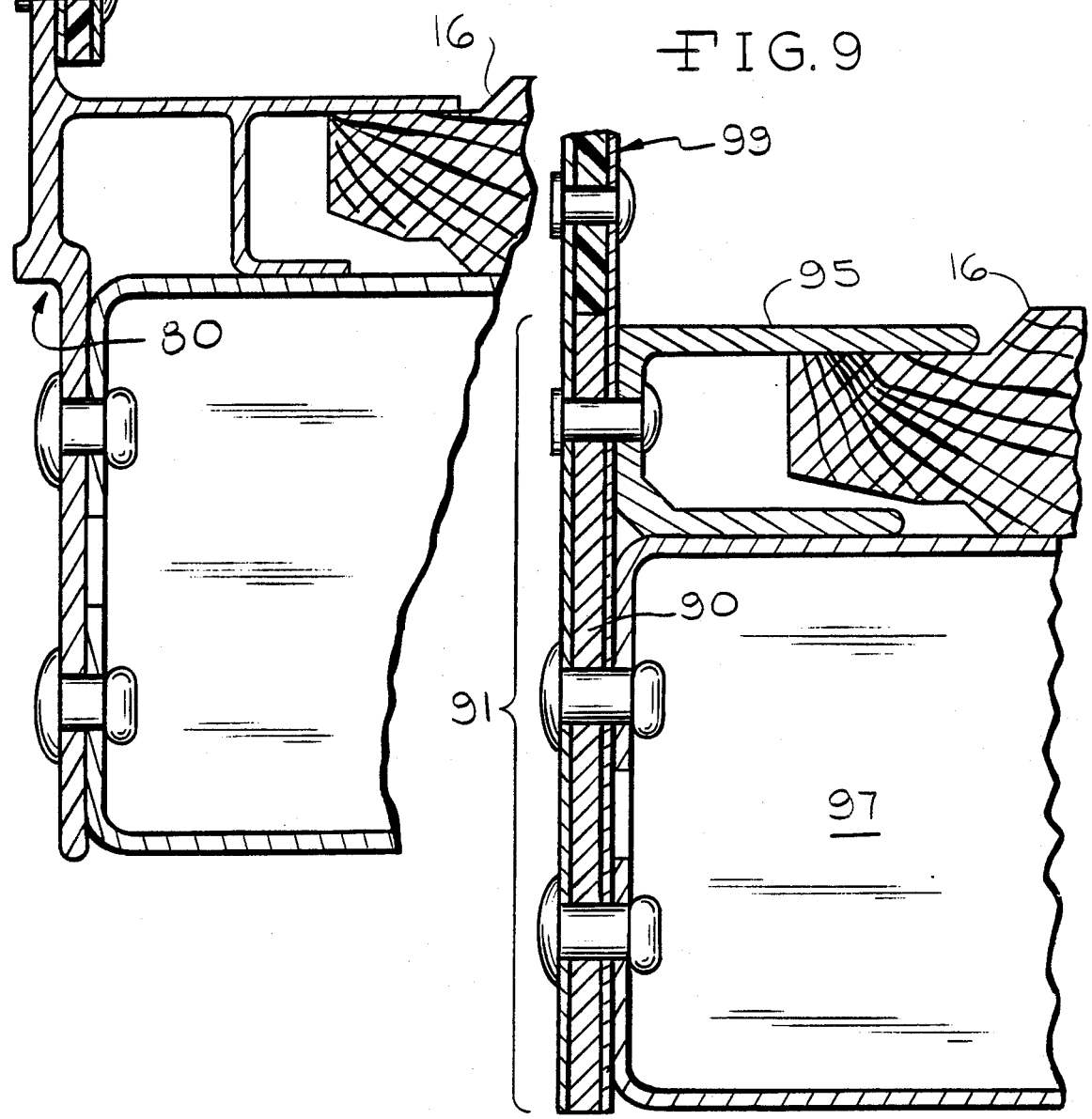

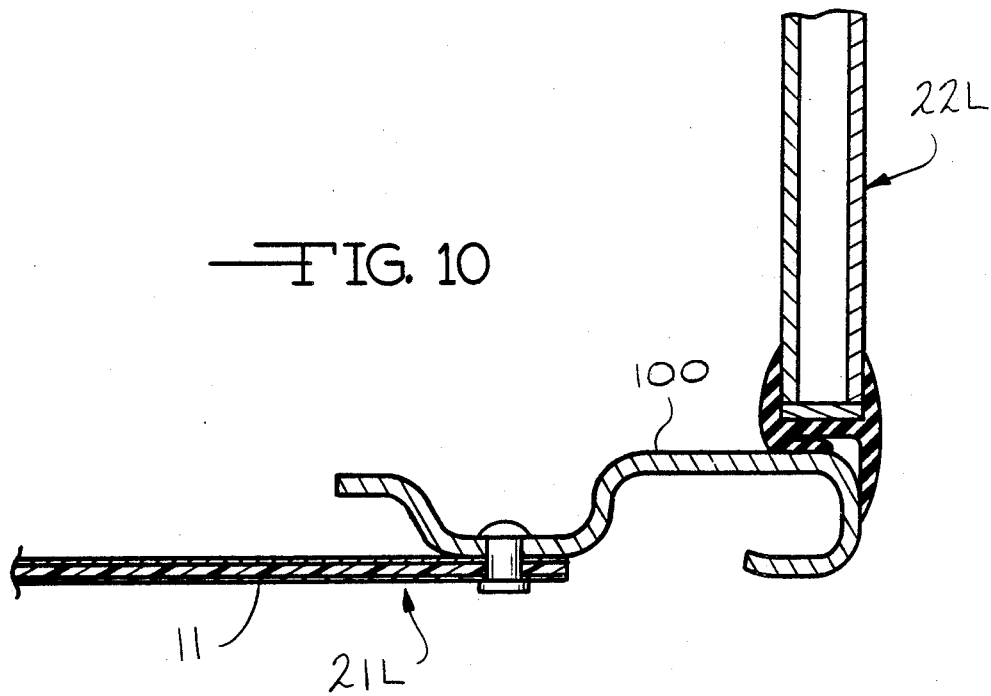
FIG. 10
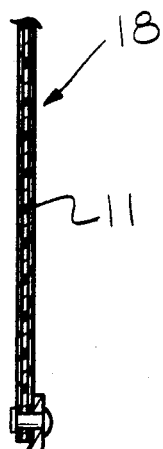
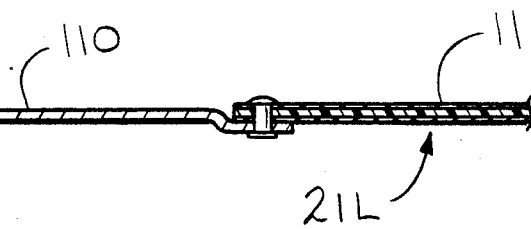
FIG. 11

CARGO VEHICLE WALL CONSTRUCTION

BACKGROUND OF THE INVENTION

The present invention generally relates to a thin wall van type semitrailer and similar cargo vehicles and containers. The invention particularly relates to a novel vehicle construction employing a multiplicity of thin composite panels having improved strength to weight ratios over prior art materials.

In recent years a new "high cube" type semitrailer has been introduced into the market place identified as a "plate wall" trailer. U.S. Pat. No. 4,212,405 teaches a plate wall trailer having unitary aluminum alloy plate side walls extending along the entire length of the trailer. Such a design is difficult to construct because of the large cumbersome aluminum plate sides. Further, field repair of such unitary plate wall sides is similarly difficult and generally requires welding which affects the material strength in the heat affected zone.

U.S. Pat. No. 4,685,721 in an attempt to overcome the disadvantages of the unitary aluminum plate wall design teaches a trailer body construction having a plurality of aluminum plate panels joined together by a series of relatively flat external posts thereby eliminating the cumbersome unitary aluminum plate wall as taught in U.S. Pat. No. 4,212,405, however the weight penalty of using aluminum plate has not been eliminated.

BRIEF SUMMARY OF THE INVENTION

In the present invention an improved plate wall vehicle construction is taught wherein each plate comprises an adhesively bonded laminate having a relatively thin resinous core material between two aluminum skins. Preferred methods of combining a multiplicity of such panels to form a vehicle plate wall and use of such a plate wall in vehicle construction is taught.

Additional features and advantages of the invention herein disclosed will become apparent to those skilled in the art upon consideration of the following detailed description of the preferred embodiment exemplifying the best mode of practicing the invention as presently perceived.

DESCRIPTION OF THE DRAWINGS

FIG. 1 shows a perspective view of a typical semitrailer embodying the present invention.

FIG. 2 is a typical rear elevational view of a semitrailer embodying the present invention.

FIG. 3 is a cross-sectional view taken along line 3—3 in FIG. 1 showing the preferred method of joining adjacent side wall panels and construction details of the composite panel.

FIG. 6 is a cross-sectional view taken along line 6—6 in FIG. 1 showing the preferred method of attaching the side wall panels to the vehicle top rail.

FIGS. 7 and 8 present a cross-sectional view taken along line 7—7 in FIG. 1 showing alternate methods of attaching the side wall composite panels to the vehicle bottom rail.

FIG. 9 is a cross-sectional view similar to FIGS. 7 and 8 showing details of the preferred construction of a frameless vehicle in the vicinity of the vehicle floor.

FIG. 10 is a cross-sectional view taken along line 10—10 in FIG. 1 generally showing attachment of the composite side panels to the vehicle rear corner post.

FIG. 11 is a cross-sectional view taken along line 11—11 in FIG. 1 generally showing attachment of the composite side panels to the vehicle front corner post.

DETAILED DESCRIPTION OF THE INVENTION

Figure 4:
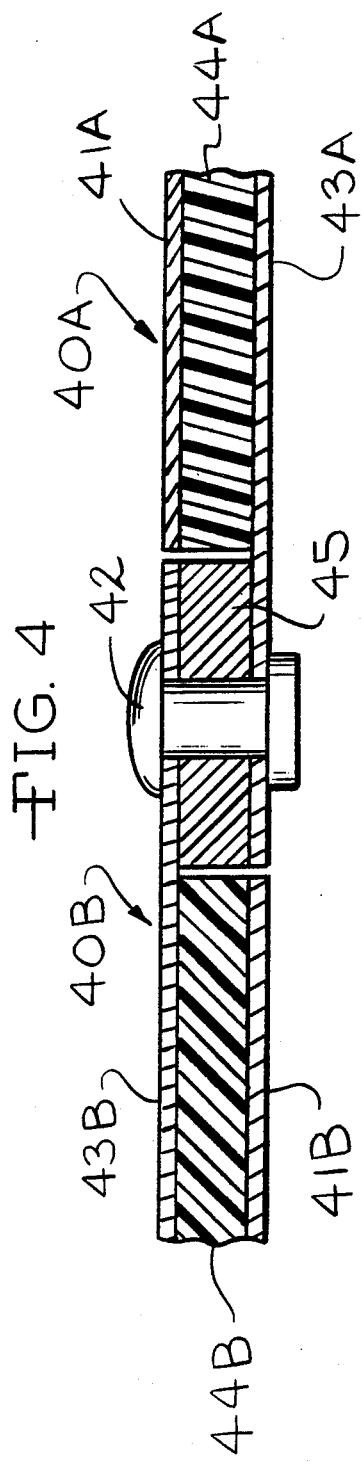
FIG. 4 is a cross-sectional view of an alternate method of joining the adjacent side wall panels shown in FIG. 3.

A typical plate wall trailer embodying the present invention is shown in FIGS. 1 and 2. Plate wall trailer 10 generally comprises a floor 16, a roof 17, a front wall 18, a pair of side walls 21L and 21R, rear cargo doors 22L and 22R, landing gear 19, and an undercarriage assembly 15.

Each side wall 21 and front wall 18 comprises a multiplicity of composite panels 11. Preferably each composite panel is rectangular having a height greater than its width. Although the composite panels 11 are shown in FIG. 1 as being relatively equal in size the width and thickness of each panel may vary.

FIG. 3 shows the preferred construction of the composite panel 11 and the preferred method of joining or splicing adjacent panels to form side walls 21 and front wall 18. Composite panel 11 comprises a laminated sandwich including a polypropylene core 30 having a preferred thickness of 0.250 inches and 0.040 aluminum face sheets 31 adhesively attached to each surface thereof. An expoxy adhesive having polypropylene particles dispersed therethrough, such as Morton-Thiokol Mor-Ad P-80 adhesive, when applied in accordance with the manufacturer's instructions has been found suitable. Thus the overall thickness of composite panel 11 is approximately 0.33 inches.

As shown in FIG. 3 adjacent composite panels are preferably joined by means of an external aluminum splice plate 14, having a preferred thickness of approximately 0.10 inches and a width of approximately 5.62 inches, riveted thereto by vertical rows of rivets 32.

Figure 5:
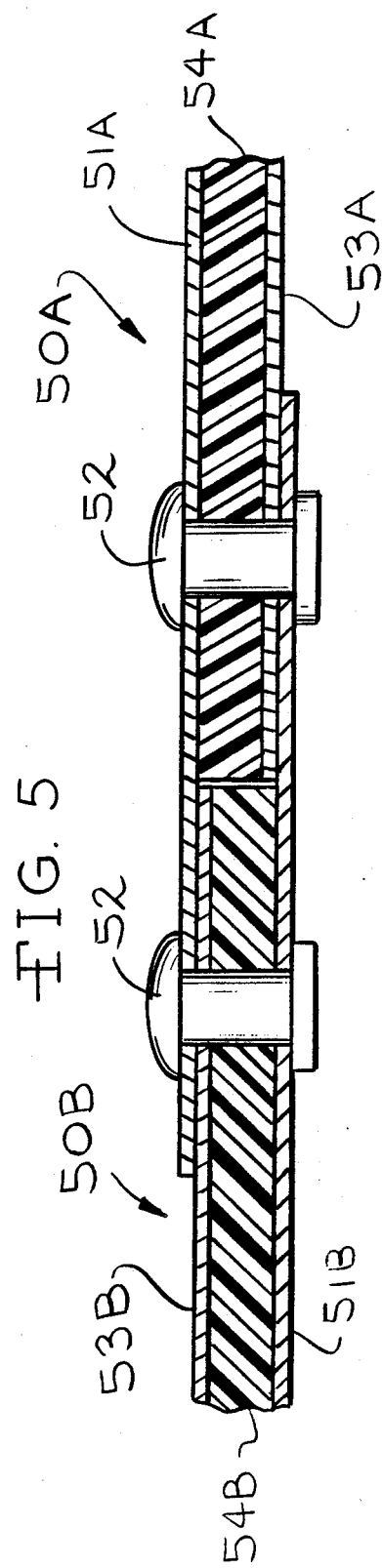
FIG. 5 is a further alternate method of joining the adjacent side wall panels shown in FIG. 3.

FIGS. 4 and 5 show alternate methods of splicing adjacent composite panels. In FIG. 4, two composite panels 40A and 40B having a central polypropylene core 44A and 44B and laminated aluminum skins 41A, 43A, 41B and 43B respectively are shown joined together in an overlapping manner whereby, except for the rivet head 42, the inside and outside wall surface is generally planar. The adjacent panels 40A and 40B are provided with one aluminum skin 43A and 43B extending beyond the end of the core 44A and 44B. The extended portions of skins 43A and 43B are arranged in an end to end overlapping orientation as shown in FIG. 4. An aluminum spacer 45, having a thickness equal to core 44A and 44B is placed between the extended skin portions and the two overlapping skins 43A and 43B along with spacer 45 are riveted together with a line of vertical rivets 42. An adhesive may additionally be used to adhere the extended skins 40A and 40B to the aluminum spacer 45.

Similarly in FIG. 5 a pair of adjacent composite panels 50A and 50B comprising a polypropylene core 54A and 54B and laminated aluminum skins 51A, 53A, 51B and 53B respectfully are provided with one aluminum skin 51A and 51B extending beyond the end of core 54A and 54B. However, in the FIG. 5 overlap joint adjacent panels 50A and 50B abut directly against one another such that the aluminum skin extensions 51A and 51B overlap the adjacent composite panel 50B and 50A respectively. Composite panels 50A and 50B are each riveted to the aluminum skin extensions 51B and 51A. An adhesive may also be used to adhere the skin extensions to the adjacent panel.

FIG. 6 shows a preferred technique for attaching the composite panels 11 to an extruded aluminum top rail 1 whereby the top rail flange 61 overlaps panel 11 and is typically riveted thereto by rivets 63.

FIGS. 7 and 8 show techniques for attaching the composite panels 11 to an extruded aluminum bottom rail 70 and 80. FIG. 8 shows a typical one piece extruded aluminum bottom rail 80 having a vertically extended flange 81 to which composite panel 11 is riveted by means of rivets 83 to the inside surface thereof.

However, in FIG. 7 the composite panel 11 is riveted to the outside surface of bottom rail flange 71. By this construction the head 74 of bottom rivet 73 may be protected from damage by use of an extruded aluminum J channel 75 affixed to bottom rail ledge 76 by any convenient attaching technique such as welding or rivets.

FIG. 9 shows a preferred technique for assembly of a frameless trailer construction embodying composite panels. The lower portion 91 of composite panel 99 is provided with an aluminum plate core 90 replacing the polypropylene core. The composite panels 99 are longitudinally joined to form a sidewall as taught above, however a longitudinal internal U-shaped channel 95 is affixed to the inside of the sidewall to provide lateral stiffness and provide means for floor attachment as shown in FIG. 9. The sidewall comprising composite panels 99 and channel 95 is attached, by rivets, to the vehicle beam cross frame members 97. The aluminum core 90 combined with U-channel 95 are designed to provide similar structural properties as the corresponding extruded aluminum bottom rail of a framed vehicle. It may also be desirable, depending on vehicle load requirements, to construct each composite panel, for use in either a framed or frameless construction, with a similar aluminum core extending longitudinally across the top of the panel or around the full perimeter of the panel.

FIGS. 10 and 11 show typical techniques for attaching composite panels 11 to the vehicle rear corner post 100 and the front corner post 110.

Although the invention has been described in detail with reference to the illustrated preferred embodiment, variations and modifications exist within the scope and spirit of the invention as described and as defined in the following claims.

We claim:

1. In a cargo vehicle having a floor, a roof, a front wall, a pair of sidewalls, and a rear opening wherein at least one of said sidewalls comprises a multiplicity of composite panels wherein each panel includes a planar core of resinous material having a metal skin adhesively bonded to each planar surface thereof, the improvement wherein said resinous core extends to within a predetermined distance from at least one edge of said metal skins, said distance from the end of said resinous core having a rigid material affixed between said skins.

2. In a cargo vehicle having a floor surface, a roof surface, a front wall surface, a pair of side wall surfaces, and a rear door surface wherein at least one of said surfaces includes at least one composite panel having a laminated structure including a core material sandwiched between two metallic skins, the improvement wherein the core of said composite panel comprises a portion of metallic material extending inward from the outer periphery of said panel and circumscribing the periphery of said core, and a resinous material extending therebetween.

3. The improvement of claim 2 wherein said core has a thickness greater than 0.10 inches and less than 0.30 inches, and said metal skin has a thickness no greater than 0.10 inches.

4. The improvement of claim 3 wherein said core has a nominal thickness of 0.250 inches and said metal skin has a nominal thickness of 0.040 inches.

5. The improvement of claim 1 wherein said rigid material is metallic.

6. In a plate wall cargo vehicle having two or more adjacent laminated wall panels a method of joining said panels, end to end, comprising the steps of:
    (1) Providing on each of said wall panels, an extension of one surface laminate beyond the edge of said wall panel;
    (2) Orient and planarly align said wall panels such that said laminate extensions overlap each other forming a space therebetween;
    (3) Position within said space a spacer to maintain said planarly alignment of said wall panels one with the other;
    (4) Affix said overlapping laminate extensions to said spacer.

7. In a plate wall cargo vehicle having two or more adjacent laminated wall panels a method of joining said panels, end to end, comprising the steps of:
    (1) Providing on each of said wall panels, an extension of one surface laminate beyond the end of said wall panel;
    (2) Orient and planarly align said wall panels such that the core of each panel abuts the other and the laminate extension of each panel overlaps the surface of the adjacent panel;
    (3) Affix the overlapping laminate extension of each panel to the other.

8. The improvement of claim 2 wherein said resinous material comprises polypropylene and said metallic material comprises aluminum.

* * * * *